(12) United States Patent
Lee et al.

(10) Patent No.: US 8,104,292 B2
(45) Date of Patent: Jan. 31, 2012

(54) DUPLEX TURBINE SHROUD

(75) Inventors: Ching-Pang Lee, Cincinnati, OH (US); Geoffrey Douglas Robinson, Fairfield, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1078 days.

(21) Appl. No.: 11/957,653

(22) Filed: Dec. 17, 2007

(65) Prior Publication Data

US 2009/0155051 A1 Jun. 18, 2009

(51) Int. Cl.
*F03B 11/00* (2006.01)

(52) U.S. Cl. .......................................... 60/806; 415/115

(58) Field of Classification Search ................ 60/806, 60/752, 754; 415/115–117, 173.1, 176, 178
See application file for complete search history.

(56) References Cited

U.S. PATENT DOCUMENTS

| | | | |
|---|---|---|---|
| 3,583,824 A | 6/1971 | Smuland et al. | |
| 4,497,610 A | 2/1985 | Richardson et al. | |
| 5,169,287 A | 12/1992 | Proctor et al. | |
| 5,169,288 A | 12/1992 | Gliebe et al. | |
| 5,993,150 A | 11/1999 | Liotta et al. | |
| 5,997,245 A | 12/1999 | Tomita et al. | |
| 6,077,036 A | 6/2000 | Heffron et al. | |
| 6,155,778 A | 12/2000 | Lee et al. | |
| 6,183,192 B1 | 2/2001 | Tressler et al. | |
| 6,196,792 B1 | 3/2001 | Lee et al. | |
| 6,270,317 B1 | 8/2001 | Manning et al. | |
| 6,345,955 B1 | 2/2002 | Heffron et al. | |
| 6,354,795 B1 | 3/2002 | White et al. | |
| 6,402,458 B1 | 6/2002 | Turner | |
| 6,609,880 B2 | 8/2003 | Powis et al. | |
| 6,783,323 B2 | 8/2004 | Shizaki et al. | |
| 7,008,178 B2 | 3/2006 | Busch et al. | |
| 7,147,432 B2 * | 12/2006 | Lowe et al. | 415/116 |
| 7,836,703 B2 * | 11/2010 | Lee et al. | 60/806 |
| 2005/0111965 A1 | 5/2005 | Lowe et al. | |
| 2007/0059178 A1 | 3/2007 | Shapiro | |
| 2007/0140849 A1 | 6/2007 | Flodman et al. | |

OTHER PUBLICATIONS

U.S. Appl. No. 11/765,522, filed Jun. 20, 2007, Lee et al.

* cited by examiner

*Primary Examiner* — Ehud Gartenberg
*Assistant Examiner* — Vikansha Dwivedi
(74) *Attorney, Agent, or Firm* — David J. Clement; Trego, Hines & Ladenheim, PLLC

(57) ABSTRACT

A gas turbine engine shroud includes a row of different first and second shroud segments alternating circumferentially therearound. The first segments have a first pattern of first cooling holes extending therethrough. The second segments have a second pattern of second cooling holes extending therethrough. The corresponding patterns have different collective flowrate capabilities.

23 Claims, 6 Drawing Sheets

DUPLEX TURBINE SHROUD

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in a high pressure turbine (HPT) which powers the compressor.

And, additional energy is extracted in a low pressure turbine (LPT) which drives an upstream fan in an aircraft turbofan aircraft engine application, or drives an external drive shaft in marine and industrial applications.

The modern combustor is annular and includes radially outer and inner combustion liners extending downstream from a forward dome to define an annular combustion zone. A row of fuel injectors and cooperating air swirl cups are mounted in the dome for discharging air atomized fuel jets that are suitably ignited for generating the combustion gases.

The fuel injectors are spaced circumferentially apart from each other typically in a uniform distribution, and correspondingly effect relatively hot streaks of combustion gases which flow downstream to the annular combustor outlet.

The maximum combustion gas temperature is found along the center of each hot streak, and the combustion gas temperature correspondingly decreases radially outwardly from the centerline of each hot streak, which is both radially between the outer and inner combustor liners, as well as circumferentially around the combustor between the circumferentially spaced apart hot streaks.

The resulting temperature pattern of the combustion gases at the annular combustor outlet varies both radially between the outer and inner liners, and circumferentially between the hot streaks, with the lower temperature gases between the hot streaks typically being referred to as cold streaks. The differential temperature between the hot and cold streaks may be several hundreds of degrees and affects performance and operation of the downstream turbine components.

More specifically, the combustion gases discharged from the combustor outlet are first received by the first stage HPT turbine nozzle which guides the gases to the following first stage row of turbine rotor blades mounted on the perimeter of a supporting rotor disk. The turbine nozzle includes a row of hollow nozzle vanes mounted radially between corresponding outer and inner bands.

The nozzle is typically segmented circumferentially in a common configuration of nozzle doublets having two vanes integrally mounted in corresponding outer and inner band segments.

The annular nozzle is therefore circumferentially divided by axial splitlines in corresponding endfaces of the outer and inner bands of the nozzle doublets. And, the endfaces typically include slots for mounting spline seals therein for maintaining the circumferential continuity of the turbine nozzle and sealing internal cooling air loss therefrom.

The number of nozzle vanes in the complete row is substantially greater than the number of fuel injectors in the combustor and is commonly not an integer multiple thereof. Accordingly, in the assembly of the combustor relative to the turbine nozzle, the fuel injectors vary in relative circumferential position with the leading edges of the row of nozzle vanes.

The hot streaks generated from the fuel injectors during operation are therefore circumferentially aligned or clocked differently or randomly from vane to vane, and therefore subject the vanes to different heat loads during operation. The hot streaks bathe the nozzle vanes in maximum temperature combustion gases, whereas the circumferentially intervening cold streaks bathe the vanes in relatively cooler combustion gases.

Accordingly, the turbine nozzle is commonly designed with circumferential uniformity having substantially identical nozzle vanes and band segments, in the typical doublet configuration for example. An even number of nozzle vanes is therefore found in the doublet nozzle configuration with two identical vanes in each doublet.

The nozzle vanes have the typical crescent profile with generally concave pressure sides and generally convex suction sides extending axially in chord between opposite leading and trailing edges. The vanes in each doublet define an inboard flow passage therebetween, with the vanes between doublets defining outboard flow passages which include the respective axial splitlines.

The inboard and outboard nozzle passages converge in the downstream direction to a minimum flow area typically defined at the trailing edge of one vane normal to the suction side of the adjacent vane.

The combustion gases are typically discharged at an oblique circumferential angle into the downstream row of turbine rotor blades which rotate the supporting rotor disk in the direction of the blade suction sides relative to the blade pressure sides.

Each nozzle doublet therefore includes a lead vane over which the turbine blades first pass, and a trail vane over which the turbine blades secondly pass during rotation.

The cold and hot streaks from the combustor are channeled axially through the flow passages of the turbine nozzle and therefore similarly bathe the turbine rotor blades in the alternating hot and cold streaks which also affects their performance during operation.

Surrounding the turbine blades is an annular turbine shroud which confines the combustion gases, including the hot and cold streaks. And, the shroud is also segmented circumferentially with identical turbine shroud segments having corresponding hooks supported in a cooperating hanger suspended from a surrounding casing or shroud support.

Accordingly, the nozzle stator vanes, turbine rotor blades, and their shrouds are typically identical in each row thereof and typically include identical cooling circuits therein for their different environments. The vanes, blades, and shrouds use a portion of pressurized air bled from the compressor for cooling thereof and achieving the desired useful life of the engine during operation.

Since the air bled from the compressor is not used in the combustor, the overall efficiency of the engine is decreased. The amount of cooling air bled from the compressor should therefore be minimized for maximizing engine efficiency.

However, the vanes, blades, and shrouds must be designed in conventional practice for identical cooling thereof in each row for protecting the airfoils from the maximum temperatures and heat loads from the hot streaks produced by the combustor notwithstanding the significantly lower temperature of the cold streaks alternating with the hot streaks during operation.

Accordingly, it is desired to provide an improved turbine nozzle which preferentially accommodates the hot and cold streaks in the combustion gases for improving performance of the gas turbine engine.

BRIEF DESCRIPTION OF THE INVENTION

A gas turbine engine shroud includes a row of different first and second shroud segments alternating circumferentially therearound. The first segments have a first pattern of first cooling holes extending therethrough. The second segments have a second pattern of second cooling holes extending therethrough. The corresponding patterns have different collective flowrate capabilities.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
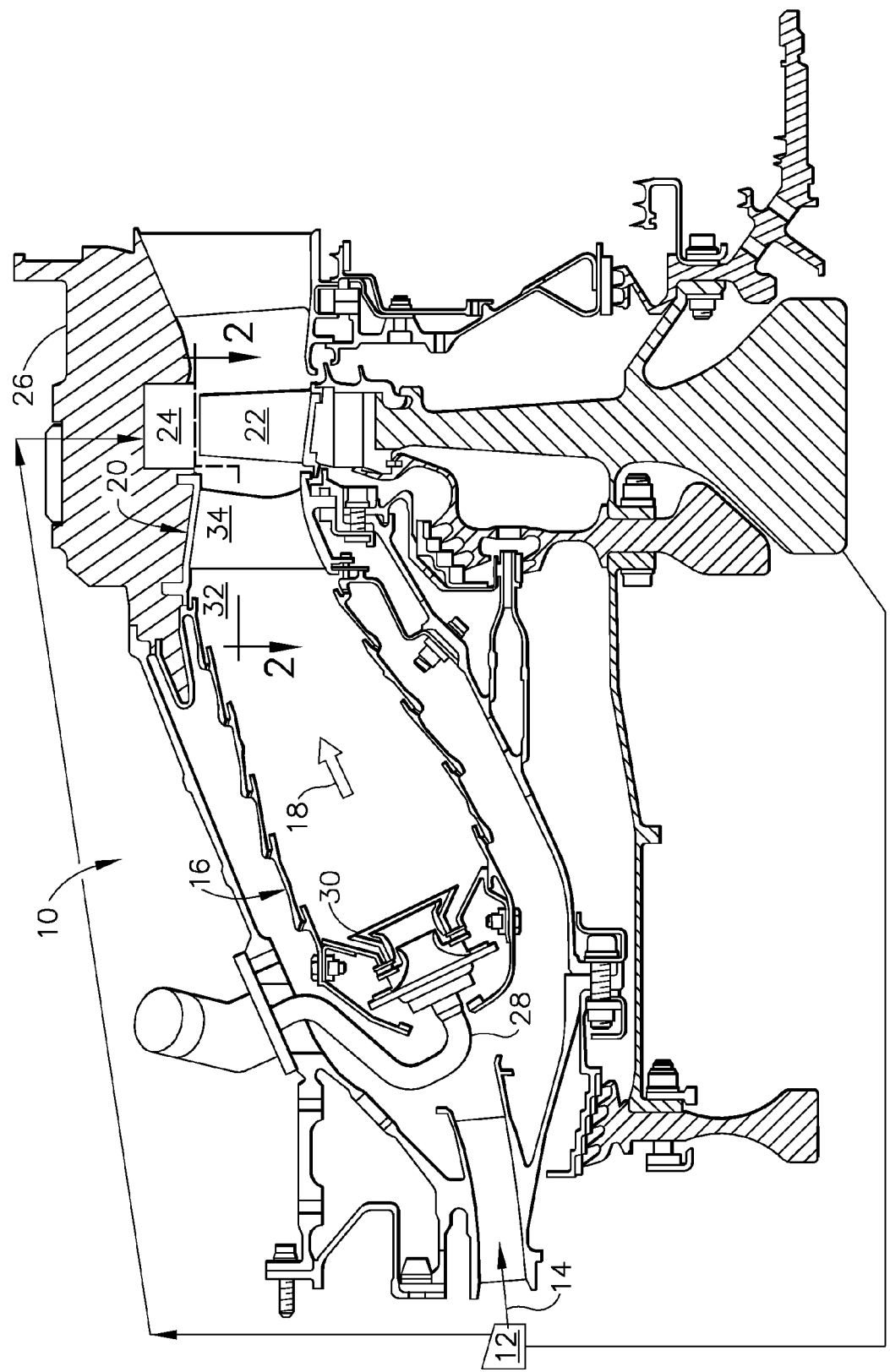
FIG. 1 is a axial sectional view of the turbine portion of a gas turbine engine powered by a combustor.

Illustrated in FIG. 1 is a portion of a gas turbine engine 10 which is axisymmetrical about a longitudinal or axial centerline axis. The engine includes a multistage axial compressor 12 for pressurizing air 14.

An annular combustor 16 is mounted downstream from the compressor and mixes the pressurized air 14 with fuel which is ignited for generating hot combustion gases 18.

The combustion gases are discharged from the combustor into an annular first stage turbine nozzle 20 in the HPT which in turn channels the gases into a row of first stage turbine rotor blades 22 directly following the nozzle. The blades are suitably mounted to the perimeter of a supporting rotor disk which in turn is joined to the rotor of the compressor 12 which is powered by the turbine blades during operation.

Surrounding the turbine blades is an annular turbine shroud 24 conventionally mounted to a surrounding turbine casing 26.

The LPT is located downstream of the HPT, and is shown in part, and includes a turbine nozzle (shown) followed by additional rotor blades that typically power an upstream fan (not shown) in an aircraft engine configuration. In alternate embodiments, the LPT may power an external drive shaft for marine and industrial applications.

The combustor 16 illustrated in FIG. 1 includes a radially outer combustor liner and a coaxial, radially inner combustor liner defining an annular combustion zone therebetween. The liners extend downstream from an annular dome and are suitably mounted inside a surrounding combustor casing.

The combustor dome includes a row of fuel injectors 28 extending through cooperating air swirling cups 30 which provide an atomized mixture of fuel and air inside the combustor which is then suitably ignited for generating the hot combustion gases 18 during operation.

The annular combustor 16 illustrated in FIG. 1 includes an annular outlet 32 at the downstream, aft end thereof through which the hot combustion gases 18 are discharged during operation. The row of fuel injectors 28 is disposed at the upstream or forward dome end of the combustor, with the individual injectors being uniformly spaced apart circumferentially from each other around the dome.

Figure 2:
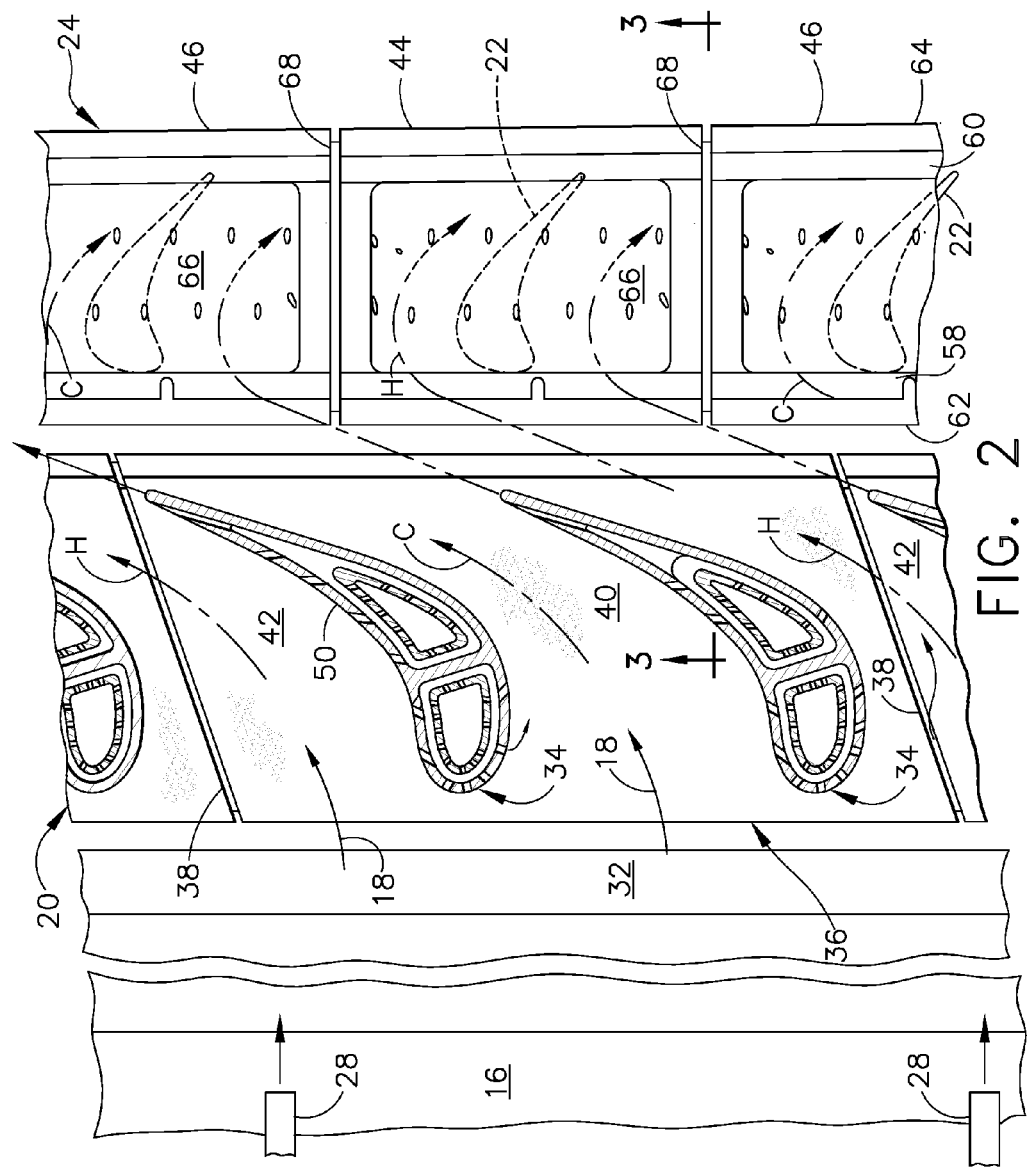
FIG. 2 is a sectional planiform view of the combustor and turbine illustrated in FIG. 1 and taken along line 2-2 to illustrate a cooperating duplex turbine shroud having alternating first and second shroud segments.

Accordingly, the combustion gases 18 generated in the combustor during operation will experience relatively hot streaks H, shown in FIG. 2, directly axially aft from the individual fuel injectors 28 with correspondingly relatively cooler combustor cold streaks C disposed circumferentially therebetween. The hot and cold streaks therefore will flow downstream through the turbine nozzle 20 and then through the first row of turbine rotor blades 22 which extract energy therefrom to rotate the supporting disk and power the compressor.

The annular turbine nozzle 20 is shown in axial view in FIG. 1 and in planiform sectional view in FIG. 2 in cooperation with the upstream combustor 16 and the downstream turbine blades 22 surrounded by the turbine shroud 24. The nozzle 20 is segmented circumferentially in a row of nozzle doublets 36, each including two hollow vanes 34 extending radially between outer and inner integral bands.

The two vanes and band segments may be integrally formed in a unitary casting or may be separately manufactured and suitably joined together, by brazing for example, to form a unitary component of the nozzle.

The annular nozzle is segmented circumferentially by corresponding axial splitlines 38 which are defined by corresponding endfaces at the opposite circumferential ends of the outer and inner bands in each doublet.

The row of nozzle vanes 34 have identical aerodynamic profiles and define substantially identical flow passages therebetween. Each of the vanes has a generally concave pressure side and circumferentially opposite, generally convex suction side extending axially in chord between opposite leading and trailing edges. And, the opposite sides of each vane extend in span over the radial height of the nozzle between the outer and inner bands.

Accordingly, the vane pair in each doublet defines circumferentially therebetween an inboard flow passage 40, without the axial splitline 38 in the two bands. Correspondingly, the end vanes between the adjacent nozzle doublets define an outboard flow passage 42 which includes the axial splitlines 38 at the endfaces of the two bands.

A significant improvement in performance of the turbine nozzle 20 illustrated in FIG. 2 may be obtained by circumferentially aligning or clocking the individual fuel injectors 28 from the combustor with corresponding ones of the outboard flow passages 42. Correspondingly, none of the fuel injectors 28 is clocked or circumferentially aligned with any of the inboard flow passages 40 in the full row of nozzle doublets 36.

This clocking or circumferential alignment of the nozzle passages with the fuel injectors may be readily accomplished by having two times as many nozzle vanes 34 as the number of fuel injectors 28, and fixedly mounting the nozzle doublets 36 so that the outboard passages 42 are axially aligned downstream with corresponding ones of the fuel injectors 28. Correspondingly, the inboard flow passages 40 are axially aligned downstream with the circumferential mid-points between any two adjacent fuel injectors 28.

In this way, the hot streaks may be diluted by spent cooling air leaking through the axial splitlines 38 between nozzle segments, and if desired, the cooling configurations for the nozzle vanes may be suitably tailored for the different heat loads caused by the hot and cold streaks.

Correspondingly, additional improvement in performance may be obtained by specifically tailoring the downstream turbine shroud 24 illustrated in FIG. 2 for the hot and cold streaks H,C of the combustion gases 18 being discharged from the turbine nozzle between the turbine blades 22.

Figure 3:
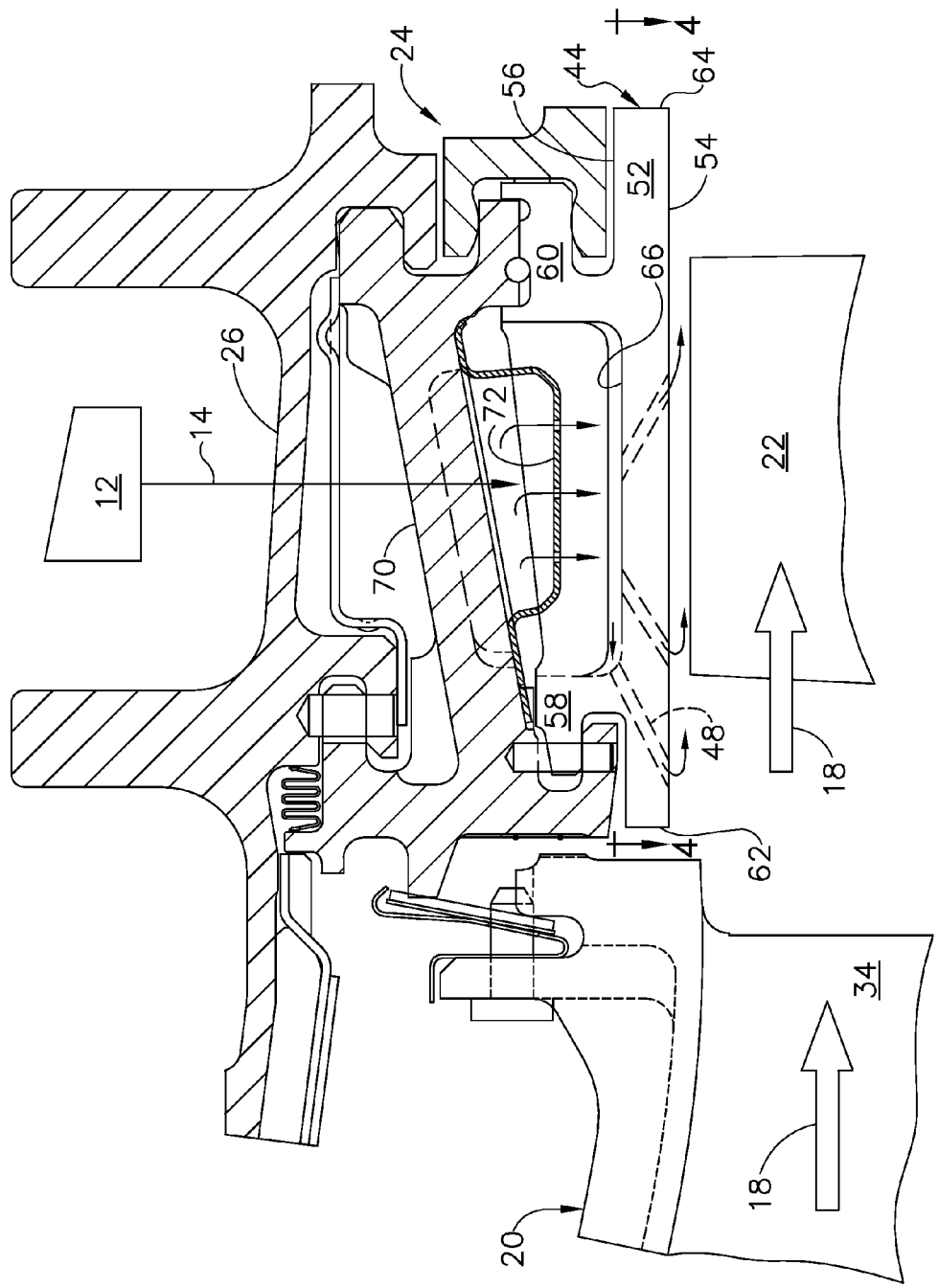
FIG. 3 is an enlarged radial sectional view of the turbine shroud illustrated in FIG. 2 and taken along line 3-3.

As shown in FIG. 3, the combustion gases 18 flow downstream past the turbine blades 22 which extract energy therefrom. Since the turbine blades 22 rotate during operation, they mix together the hot and cold streaks during axial passage therethrough.

However, the hot combustion gases 18 initially flow past the exposed leading edge region of the turbine shroud 24 and leak in small part through the radial tip clearance between the blade tips and surrounding shroud.

Accordingly, the turbine shroud 24 initially illustrated in FIGS. 2 and 3 is suitably modified to specifically cooperate with the hot and cold streaks of the combustion gases for further improving engine performance.

More specifically, the turbine shroud 24 has an improved duplex configuration including an annular row of different first and second circumferentially arcuate turbine shroud segments 44,46 alternating circumferentially around the perimeter of the shroud and around the row of turbine blade tips.

In a conventional turbine shroud, the shroud segments are identical in configuration and have identical cooling circuits sized for withstanding the hot streaks from the combustor. Accordingly, the turbine shrouds will be adequately cooled for effecting long life against the heat influx from the hot streaks, but at the expense of excess cooling air where the shrouds bound the cold streaks.

Instead of using identical shroud segments around the full perimeter of the turbine shroud, the first and second types of shroud segments 44,46 may be introduced to complement the hot and cold streaks and reduce the cooling air requirements therefor, and correspondingly increase engine efficiency.

Figure 4:
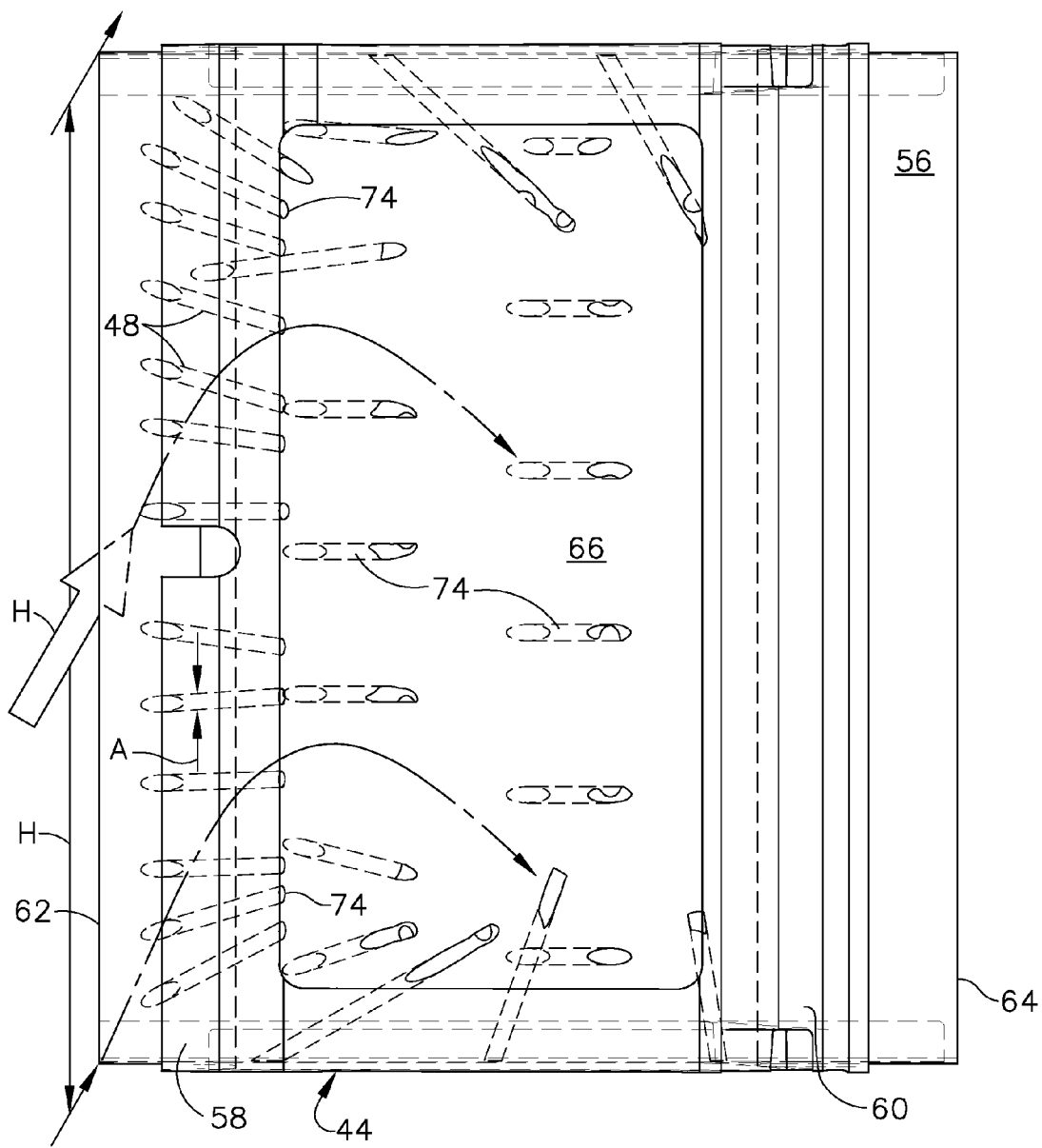
FIG. 4 is a top view of the first turbine shroud segment illustrated in FIG. 3 and taken along line 4-4.
Figure 5:
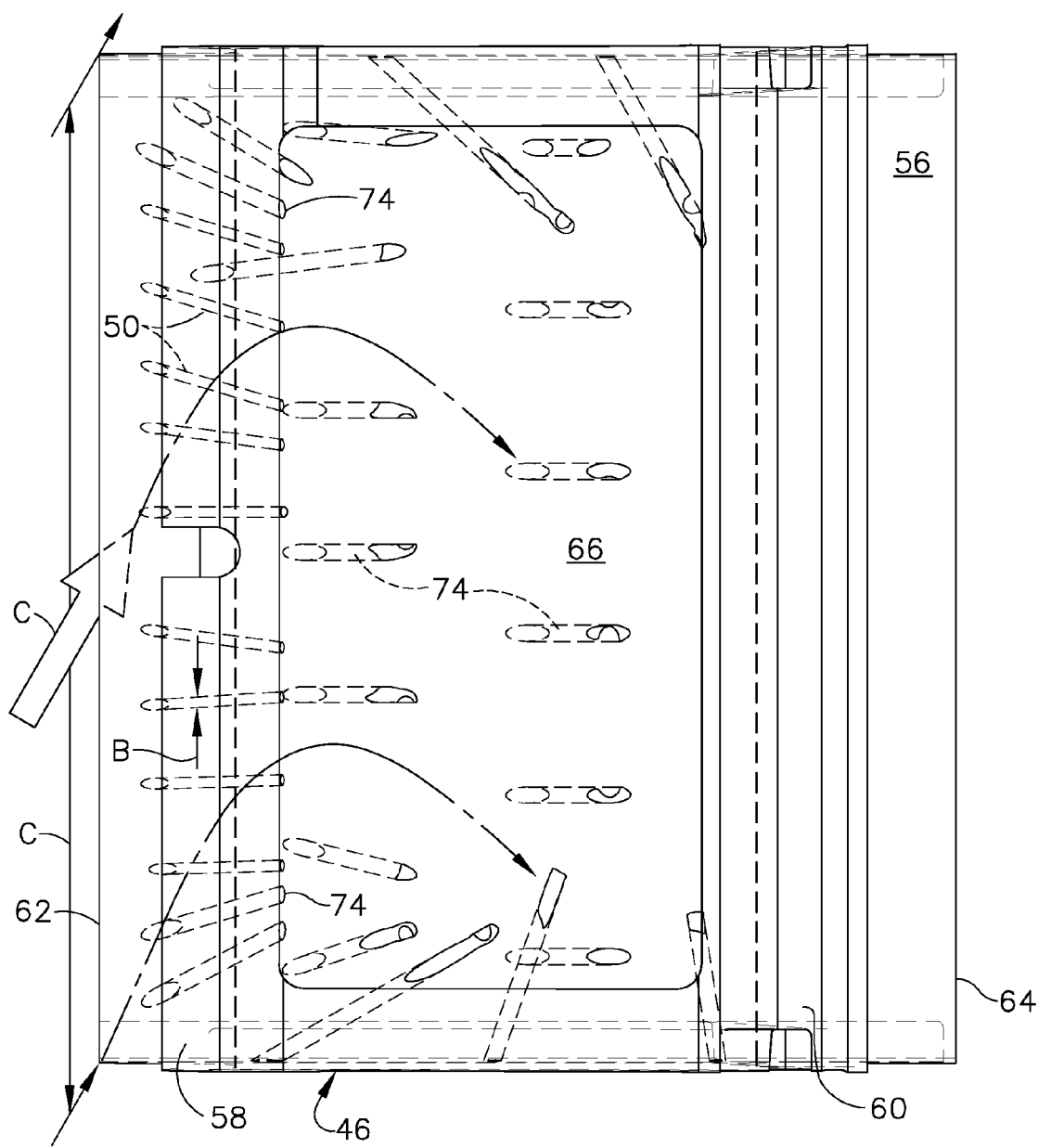
FIG. 5 is a top view, like FIG. 4, of the second turbine shroud segments illustrated in FIG. 2.

The first and second segments 44,46 are illustrated in part in FIG. 2 and are enlarged in isolation in FIGS. 4 and 5 in accordance with exemplary embodiments thereof.

As shown in FIG. 4, the first segment 44 has a first pattern of first cooling holes 48 extending radially therethrough. In FIG. 5, each of the second segments 46 has a corresponding second pattern of second cooling holes 50 extending radially therethrough. And, the two patterns of holes 48,50 have specifically different collective flowrate capacity or capabilities for matching the different heat flux from the hot and cold streaks, respectively.

The duplex shroud segments 44,46 initially illustrated in FIGS. 2 and 3 may have any conventional design and structural configuration, and are preferably identical in configuration to each other except as modified hereinbelow for different cooling thereof.

Each segment 44,46 therefore includes an arcuate plate or panel 52 having radially or transversely opposite front and back surfaces 54,56. The front or radially inboard surfaces 54 are circumferentially arcuate or concave and smooth and closely surrounds the radially outer tips of the turbine rotor blades 22, with a relatively small radial clearance therebetween.

The radially outer or back surfaces 56 are circumferentially convex and are conventionally mounted to the outer casing 26. More specifically, each segment 44,46 includes axially forward and aft rails or hooks 58,60 extending integrally outwardly from the back surfaces 56.

The forward hook 58 extends the full circumferential width of each segment 44,46 as illustrated in FIGS. 4 and 5 and is located closely adjacent to the leading edge 62 of the shroud segments. Correspondingly, the aft hook 60 also extends the full circumferential width of the segments 44,46 and is located closely adjacent to the trailing edge 64 thereof.

The two hooks 58,60 in each segment are spaced axially apart to define a substantially rectangular pocket 66 bound axially by the two hooks 58,60 and bound circumferentially by corresponding rails or ribs along the circumferential ends of the segments.

As shown in FIG. 2, the alternating segments 44,46 adjoin each other circumferentially at corresponding axial splitlines 68 defined by the adjoining endfaces, in which conventional spline seals are located.

As shown in FIG. 3, the full row of shroud segments 44,46 are conventionally mounted to corresponding hangers 70, which in turn are mounted to the surrounding outer casing 26 or shroud support.

Each shroud segment typically includes a conventional impingement baffle 72 mounted between the hanger and corresponding pocket 66, with the baffle including a multitude of small impingement holes for providing backside impingement cooling of each shroud segment 44,46 over the substantial surface area of the corresponding pockets 66.

A portion of the compressor discharge air 14 is suitably bled from the compressor 12 and channeled to the turbine shroud 24 as illustrated schematically in FIGS. 1 and 3 for providing backside cooling of the shroud segments.

This basic structural configuration of the turbine shroud 24 and cooling supply therefor is conventional, and is modified hereinbelow for increased performance.

More specifically, the pressurized cooling air 14 illustrated in FIG. 3 first cools the back surface of each shroud segment 44,46 by impingement cooling, with the spent impingement cooling air then being discharged through the respective patterns of cooling holes extending through the panels 52.

In particular, the first and second cooling holes 48,50 shown in FIGS. 3-5 extend through the corresponding panels 52 from the respective pockets 66 at an inclination angle forward under the corresponding forward hooks 58 to the inboard front surfaces 54 of the panels for discharging the air coolant.

By configuring the two sets of corresponding leading edge holes 48,50 differently, these holes effect different collective flowrate capabilities for matching the different heat flux from the corresponding hot and cold combustor streaks. In particular, the second cooling holes 50 have a reduced or smaller collective flowrate capability than the first cooling holes 48 since lower heat flux is effected by the cold streaks than by the hot streaks.

The first pattern of first holes 48 illustrated in FIG. 4 include a forwardmost first row of nine of these holes centrally distributed between the lateral ends of the segments. These first holes are inclined at a shallow inclination angle forwardly under the forward hook 58 to provide outlets in the front surface 54 illustrated in FIG. 3 closely adjacent to the shroud leading edge 62, yet also spaced forwardly from the blade tips.

Correspondingly, the second pattern of second holes 50 illustrated in FIG. 5 are also arranged in an identical row of nine holes centrally distributed between the lateral ends of the second segments 46, and are inclined identically under the forward hook 58 to provide outlets in the front surfaces 54 of the leading edge overhang in the same manner illustrated in FIG. 3.

In this way, both sets of first and second shroud segments 44,46 have identical leading edge overhangs forward of the row of turbine blades 22 and discharge the spent impingement coolant 14 under the forward hooks 58 and forward of the blade tips.

This overhang region of the shroud segments is difficult to cool due to the forward hooks 58, and first receives the hot combustion gases discharged from the turbine nozzle 20. The different collective flowrate capabilities of the first and second holes 48,50 may therefore be used to advantage to complement the different heat flux from the hot and cold combustor streaks.

The relatively large first holes 48 convectively cool the leading edge overhang of the first segments 44 which are subject to the hot streaks.

Correspondingly, the relatively small second holes 50 convectively cool the leading edge overhang of the second segments 46 against the lower heat flux from the corresponding cold streaks.

Since the hot streaks are born at the corresponding fuel injectors 28 of the combustor illustrated in FIG. 2, they flow axially downstream through the turbine nozzle 20 to the turbine blades and surrounding turbine shroud. The alternating first shroud segments 44 may therefore be circumferentially aligned or clocked with the fuel injectors 28 in a one-to-one correspondence for receiving the hot combustion streaks H therefrom over the relatively large first cooling holes 48 thereof.

Correspondingly, the alternating second shroud segments 46 are also clocked circumferentially offset with the corresponding fuel injectors 28 for receiving the cold combustion streaks C from the circumferential space between the injectors. In other words, the portions of the combustor annulus between adjacent fuel injectors 28 carry the cold streaks axially downstream through the turbine nozzle, and those mid-injector spaces may be clocked with the second shroud segments 46 to discharge the cold streaks over the smaller second holes 50.

Since the leading edge region of the second segments 46 is subject to the cold streaks, it does not require as much cooling as the corresponding leading edge region of the first segments 44 subject to the hot streaks. In this way, the second holes 50 may be specifically designed with a different and lower collective flowrate capability than the first holes 48 to match the different heat flux from the hot and cold streaks.

As indicated above, the number of nozzle vanes 34 illustrated in FIG. 2 is twice the number of fuel injectors 28 which permits clocking of the nozzle doublets relative to the fuel injectors 28. The nozzle splitlines 38 and corresponding outboard flow passages 42 are specifically clocked with the corresponding fuel injectors 28 for receiving the corresponding hot streaks.

Correspondingly, the inboard flow passages 40 of the nozzle doublets, without the nozzle splitlines 38, are clocked offset with the fuel injectors, and clocked with the mid-injector annulus spacing for receiving the cold streaks.

Accordingly, the first turbine shroud segments 44 are clocked with both the nozzle splitlines 38 and corresponding fuel injectors 28 for receiving the hot streaks over the first cooling holes 48. And, the second shroud segments 46 are clocked between the nozzle vanes 34 in each doublet for receiving the cold streaks over the second holes 50.

Each nozzle doublet 36 and pair of vanes 34 therein corresponds with a pair of the first and second segments 44,46, with the collective number of shroud segments 44,46 matching the total number of nozzle vanes 34. And, each pair of adjoining shroud segments 44,46 is clocked within the discharge swirl angle of the corresponding nozzle doublet.

Each first shroud segment 44 is clocked with its corresponding outboard flow passage 42 of the nozzle; and each second shroud segment 46 is clocked with its corresponding inboard flow passage 40 of the nozzle.

In this way, the hot and cold streaks in the combustion gases 18 may be controlled in their flow downstream through the gas turbine engine to ensure that the hot streaks are discharged through the outboard flow passages 42 to corresponding ones of the first shroud segments 44. And, the cold streaks from the inboard flow passages 40 of the turbine nozzle are discharged over the corresponding second shroud segments 46.

As shown in FIG. 2, the combustion gases follow a serpentine flow path axially downstream between the nozzle vanes 34 and turbine blades 22 that have the conventional crescent profiles which turn or redirect the combustion gas flow for maximum thermodynamic efficiency. The hot and cold streaks are discharged at a suitable swirl angle from the corresponding inboard and outboard flow passages 40,42 of the turbine nozzle toward the downstream blades and surrounding turbine shrouds. The turbine blades will then redirect the combustion gases with an opposite swirl angle as they also mix together the hot and cold streaks due to the rotary action thereof.

Nevertheless, the leading edge overhang region of the shroud segments illustrated in FIG. 3 remains subject to the different heat flux from the hot and cold streaks before mixing of those streaks by the turbine blades. By differently configuring the two types of otherwise identical shroud segments 44,46 for different cooling air flowrate capabilities in the leading edge overhang regions thereof, a significant reduction in coolant requirement may be achieved due to the decreased cooling requirement of the second shroud segments 46 subject to the cold streaks.

As further shown in FIGS. 3-5, the first and second patterns of cooling holes in the shroud segments 44,46 also include respective pluralities of third cooling holes 74 extending through the panels 52 from the pockets 66 to the front surfaces 54 of the corresponding shroud segments 44,46 in most part aft or behind the forward rows of first and second holes 48,50. In the two embodiments illustrated in FIGS. 4 and 5, the third holes 74 are arranged primarily in two rows along the circumferential width of the segments, and are axially spaced apart from each other as best shown in FIG. 3 for introducing three rows of inclined film cooling holes spaced apart axially between the leading and trailing edges of the shroud segments.

The first row of cooling holes in the shroud segments 44,46 is the corresponding first and second holes 48,50 which are preferably different in size for the requisite different flowrates therefor. The first holes 48 illustrated in FIG. 4 have a nominal flow diameter A, with the second cooling holes 50 illustrated in FIG. 5 having a different nominal flow diameter B, which is preferably less than the diameter A.

For example, the diameter A of the first cooling holes 48 may be in the conventional range of about 15-25 mils (0.38-0.64 mm) for suitably cooling the leading edge region of the first segments 44 subject to the hot streaks.

The diameter B of the second holes 50 may be suitably smaller than the corresponding diameter of the first holes 48, which may be accomplished by sizing the second holes 50 at the lower end of the conventional diameter range and sizing the first holes 48 at the upper end of the diameter range.

The diameter size of the cooling holes has a practical limit to ensure effective internal convection cooling through the inclined holes under the forward hooks 58 for effecting durability and long useful life of the shroud segments. The upper limit in hole size is subject to the increased flowrate of coolant and the corresponding decrease in engine efficiency.

In the region of the shroud segments aft of the forward, first row cooling holes 48,50, the hot and cold combustion gas steaks are mixed by the rotating turbine blades 22 and eliminate the distinction therebetween. And, the impingement baffles 72 provide effective backside cooling of the shroud segments in this region.

Accordingly, a minimum number of the third holes 74 is required for adequately cooling the pocket region of the segments, and such third holes may therefore have conventional size and pattern as desired in the duplex shroud segments 44,46.

The third holes 74 in the second segments 46 preferably match in size, pattern, and flowrate capability the corresponding third holes 74 in the first shroud segments 44. The third holes 74 may have the same flow diameter, such as the diameter A of the conventional first holes 48, and same position relative to the first and second hole patterns. The two segment hole patterns may therefore be substantially identical to each other except as modified for the different cooling requirements along the leading edges of the segments 44,46.

FIG. 2 illustrates how the duplex shroud segments 44,46 circumferentially abut each other and typically include axial spline seals therebetween. The leading edge regions of the segments axially overhang forwardly the row of turbine blades 22 as best illustrated in FIG. 3. And, the forward hooks 58 support the forward overhang of the segments and increase thermal mass of the segments and increase the difficulty of cooling the forward overhang.

Furthermore, each of the shroud segments 44,46 illustrated in FIGS. 4 and 5 includes respective forward corners bridging the leading edge 62 of the panels and the lateral or circumferential edges at the splitlines 68. The forward hooks 58 extend circumferentially along each segment and also over each forward corner.

In FIG. 2, the combustion gases 18 are discharged from the aft end of the turbine nozzle 20 with the conventional sinusoidal temperature pattern including maximum temperature associated with the hot streaks and minimum temperature associated with the cold streaks, and varying circumferentially therebetween. The circumferential boundaries of the hot and cold streaks are therefore gradual in temperature value and vary in swirl angle over the operating cycle of the engine.

The maximum temperature of the hot streaks is found the circumferential middle of the outboard flow passages 42 and corresponds with the circumferential middle or center region of the first shroud segments 44.

Correspondingly, the minimum temperature of the cold streaks is found near the circumferential middle of the inboard flow passages 40 and corresponds with the circumferential middle or center region of the second shroud segments 46.

Accordingly, the larger first cooling holes 48 illustrated in FIG. 4 bridge the circumferential middle of the leading edge of the first segments 44 to ensure effective cooling of the shroud under the heat flux from the hot streaks. Correspondingly, the smaller second cooling holes 50 illustrated in FIG. 5 similarly bridge the circumferential middle of the leading edge of the second shroud segments 46 to complement the lower heat flux from the cold streaks.

The two forward corners of each duplex segment 44,46 are therefore subject to the variation in temperature between the hot and cold streaks and are typically additionally difficult to cool due to their corner location and configuration at the splitlines.

Accordingly, in one embodiment, the two forward corners of each of the duplex shroud segments 44,46 may include identical ones of the third holes 74 terminating near the leading edges 62, and laterally bounding the corresponding first and second holes 48,50 of the respective shroud segments 44,46.

In FIG. 4, the first row of first holes 48 number nine, and are bound by two of the third holes 74 in each of the two forward corners for a collective total of thirteen leading edge holes. This ensures maximum cooling of the two forward corners of the first segments 44.

In FIG. 5, the first row of second holes 50 also numbers nine, and is similarly bound by two of the third cooling holes 74 in each of the two forward corners, again having a collective total of thirteen leading edge holes, to again ensure effective cooling of the forward corners of the second shroud segments 46.

In the exemplary embodiments illustrated in FIGS. 4 and 5, the first and second segments 44,46 and the collective cooling hole patterns are substantially identical to each other except for the different first and second holes 48,50 therein specifically configured for the different coolant flowrate requirements thereof.

Figure 6:
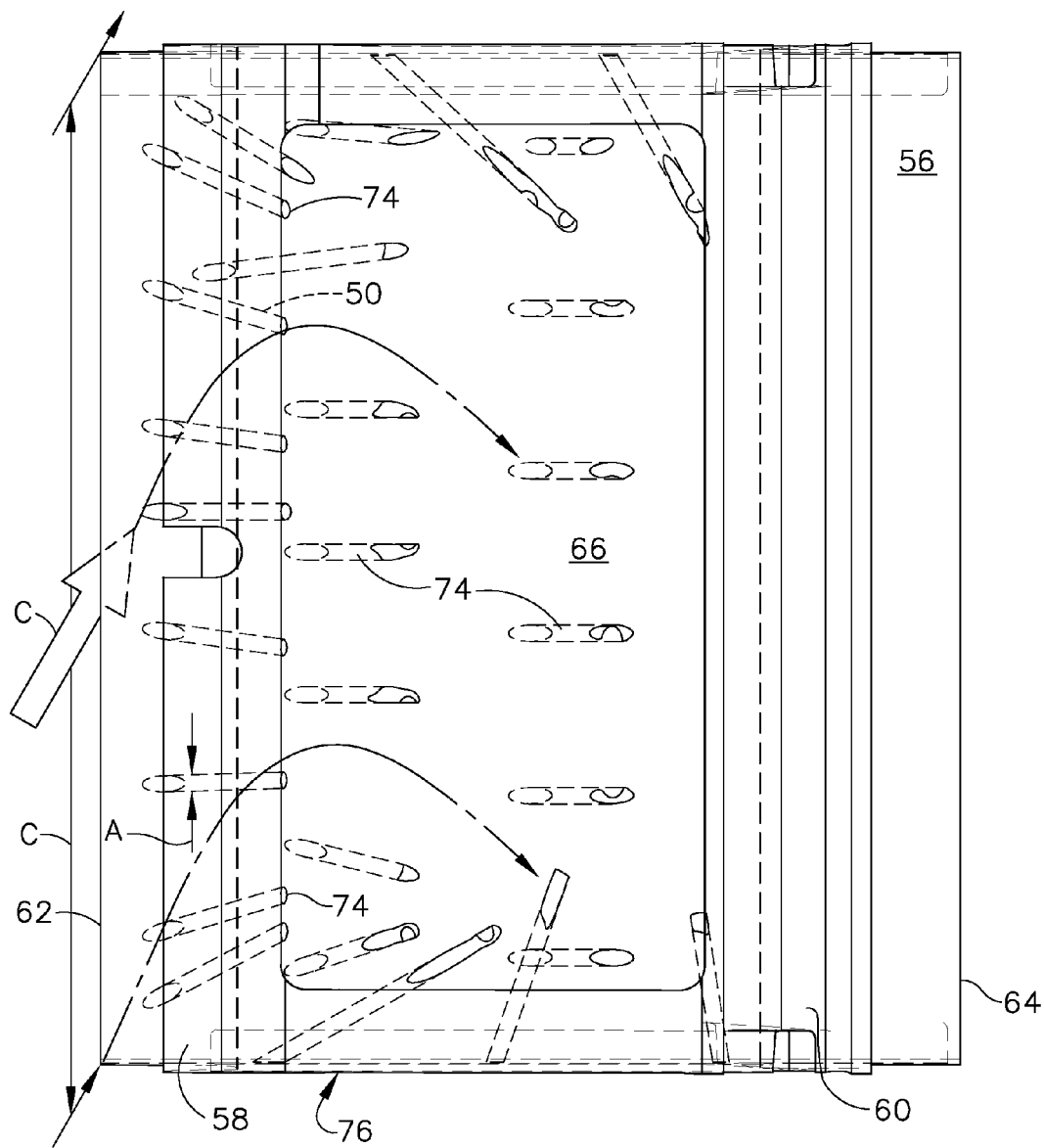
FIG. 6 is a top view, like FIG. 4, of the second turbine shroud segments in an alternate embodiment.

In contrast, FIG. 6 illustrates an alternate embodiment of the reduced-coolant second segments 46 illustrated in FIG. 5, and designated 76. The second shroud segments 76 illustrated in FIG. 6, like those illustrated in FIG. 5, will alternate with the first shroud segments 44 illustrated in FIG. 4 circumferentially around the full perimeter of the turbine shroud.

In FIG. 6, the second pattern of cooling holes is different than the first pattern of cooling holes illustrated in FIG. 4, with the second pattern preferably having fewer of the second holes 50 than the number of first holes 48 in the first pattern for the first segments 44.

For example, the first row of second holes 50 illustrated in FIG. 6 numbers five instead of nine in the FIG. 4 embodiment. These first holes 50 may be uniformly spaced apart from each other along the leading edge of the shroud segments. In this way, the collective flowrate of the second holes 50 may be reduced compared to the collective flowrate of the first holes 48 to complement the cold and hot streaks, respectively.

Since the number of second holes 50 in the FIG. 6 embodiment has been reduced in the first row, the first holes 48 of the first segments 44 and the second holes 50 of the second segment 76 may have the same size or flow diameter A within the conventional range disclosed above. And, the third holes may be identical to those in the previous embodiments.

These various embodiments of the turbine shroud segments permit relatively minor modifications thereof for matching the known differences in temperature of the hot and cold streaks. FIG. 2 illustrates the ability of clocking both the turbine nozzle 20 and turbine shroud 24 with the upstream fuel injectors 28 of the combustor to control the circumferential location of the hot and cold streaks as they flow downstream past the nozzle and shrouds.

The corresponding components of the turbine subject to the different hot and cold streaks may therefore be preferentially configured to provide maximum component cooling along the hot streaks and correspondingly reduced cooling along the cold streaks for reducing the overall cooling flow requirements of the turbine, and thereby increasing engine efficiency.

By reducing the cooling flow requirements of the second shroud segments subject to the cold streaks, overcooling thereof can be eliminated or reduced, and the differential operating temperatures will be reduced which correspondingly lowers thermal stress in the shroud segments for longer part life.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine apparatus comprising:
   an annular combustor having a row of fuel injectors;
   an annular turbine nozzle following said combustor and having a row of vane doublets with axial splitlines therebetween;
   a row of turbine blades following said nozzle;
   a duplex turbine shroud surrounding said blades, and comprising a row of different first and second shroud segments alternating circumferentially around said blades;
   said first segments having a first pattern of first cooling holes clocked with said fuel injectors for receiving hot combustion streaks therefrom over said first cooling holes; and
   said second segments having a second pattern of second cooling holes clocked offset with said injectors for receiving cold combustion streaks from the spaces therebetween over said second cooling holes, wherein said second cooling holes have smaller diameters than said first cooling holes.

2. An apparatus according to claim 1 wherein each of said first and second shroud segments comprises:
   a panel having opposite front and back surfaces, with forward and aft hooks extending from said back surface to define a pocket therebetween; and
   said first and second cooling holes extend through said panels from said pockets to said front surfaces, with said second cooling holes having a reduced collective flowrate capability than said first cooling holes.

3. An apparatus according to claim 2 wherein:
   said first cooling holes are inclined under said forward hook in said first segments; and
   said second cooling holes are inclined under said forward hook in said second segments and have a smaller collective flowrate capability than said first cooling holes.

4. An apparatus according to claim 3 wherein said first and second patterns further comprise a plurality of third cooling holes extending through said panels from said pockets to said front surfaces aft of said first and second cooling holes.

5. An apparatus according to claim 4 wherein said second pattern has fewer second cooling holes than said first pattern has first cooling holes.

6. An apparatus according to claim 4 wherein said third cooling holes have the same diameter and position in said first and second patterns.

7. An apparatus according to claim 6 wherein:
   each of said first and second segments includes respective corners bridging the leading edge of said panels and lateral edges thereof along said forward hooks; and
   said corners include identical ones of said third cooling holes terminating near said leading edge and laterally bounding said first and second cooling holes in said first and second segments.

8. An apparatus according to claim 7 wherein said first and second segments and said first and second patterns are substantially identical except for said different first and second cooling holes therein.

9. An apparatus according to claim 8 wherein:
   said first shroud segments are clocked with said nozzle splitlines for receiving said hot combustion streaks over said first cooling holes;
   said second shroud segments are clocked between said vanes in each doublet for receiving said cold combustion streaks over said second cooling holes; and
   said second cooling holes are smaller in diameter than said first cooling holes.

10. A duplex turbine shroud comprising:
    a row of different first and second shroud segments alternating circumferentially;
    said first segment having a first pattern of first cooling holes extending therethrough; and
    said second segment having a second pattern of second cooling holes extending therethrough, wherein said second cooling holes are different in size than said first cooling holes.

11. A shroud according to claim 10 wherein each of the said first and second segments comprises:
    a panel having opposite front and back surfaces, with forward and aft hooks extending from said back surface to define a pocket therebetween; and
    said first and second cooling holes extend through said panels from said pockets to said front surfaces with different collective flowrate capabilities.

12. A shroud according to claim 11 wherein:
    said first cooling holes are inclined under said forward hook in said first segment; and
    said second cooling holes are inclined under said forward hook in said second segment and have a different collective flowrate capability than said first cooling holes.

13. A shroud according to claim 12 wherein said first and second patterns further comprise a plurality of third cooling holes extending through said panels from said pockets to said front surfaces aft of said first and second cooling holes.

14. A shroud according to claim 13 wherein said second pattern is different than said first pattern.

15. A shroud according to claim 14 wherein said second pattern has fewer second cooling holes than said first pattern has first cooling holes.

16. A shroud according to claim 15 wherein said first and second cooling holes have the same diameters.

17. A shroud according to claim 13 wherein said third cooling holes in said second segment match said third cooling holes in said first segment.

18. A shroud according to claim 17 wherein said third cooling holes have the same diameter and position in said first and second patterns.

19. A shroud according to claim 13 wherein:
    each of said first and second segments includes respective corners bridging the leading edge of said panels and lateral edges thereof along said forward hooks; and
    said corners include identical ones of said third cooling holes terminating near said leading edge and laterally bounding said first and second cooling holes in said first and second segments.

20. A shroud according to claim 10 wherein said second cooling holes have smaller diameters than said first cooling holes.

21. The shroud of claim 10 in combination with an upstream turbine nozzle and annular combustor having a row of fuel injectors, and said first shroud segments are clocked with said injectors for receiving hot combustion streaks therefrom over said first cooling holes thereof.

22. A combination according to claim 21 wherein said second shroud segments are clocked offset with said injectors for receiving cold combustion streaks from the spaces therebetween over said second cooling holes of said second segments.

23. A combination according to claim 22 wherein:
said turbine nozzle includes a row of vane doublets having axial splitlines therebetween;
said first shroud segments are clocked with said nozzle splitlines for receiving said hot combustion streaks over said first cooling holes;
said second shroud segments are clocked between said vanes in each doublet for receiving said cold combustion streaks over said second cooling holes; and
said second cooling holes are smaller in diameter than said first cooling holes.

\* \* \* \* \*